United States Patent [19]

Crestetto

[11] 4,160,562

[45] Jul. 10, 1979

[54] AUTOMOTIVE BUMPER

[76] Inventor: Giovanni Crestetto, Via Torino 73, Beinasco (Turin), Italy

[21] Appl. No.: 857,387

[22] Filed: Dec. 5, 1977

[51] Int. Cl.² .................... B60R 19/00; B60R 21/14; B61F 19/04
[52] U.S. Cl. .................................. 293/120; 293/102
[58] Field of Search ........................ 293/60, 70, 98

[56] References Cited

U.S. PATENT DOCUMENTS

| | | | |
|---|---|---|---|
| 1,613,043 | 1/1927 | Markonich | 293/98 |
| 3,827,740 | 8/1974 | Golze | 293/98 |
| 3,909,053 | 9/1975 | Koch | 293/98 |
| 4,010,469 | 3/1977 | Cantrell | 293/98 |

FOREIGN PATENT DOCUMENTS 869825  6/1961  United Kingdom ............... 243/98

Primary Examiner—Trygve M. Blix
Assistant Examiner—D. W. Keen
Attorney, Agent, or Firm—James B. Raden; William J. Michals

[57] ABSTRACT

A bumper for automotive vehicles, consisting of one single shaped element of thin sheet steel, with a substantially "C" - shaped cross-section, which consists of a body and two wings, the body having at least one longitudinal rib.

1 Claim, 1 Drawing Figure

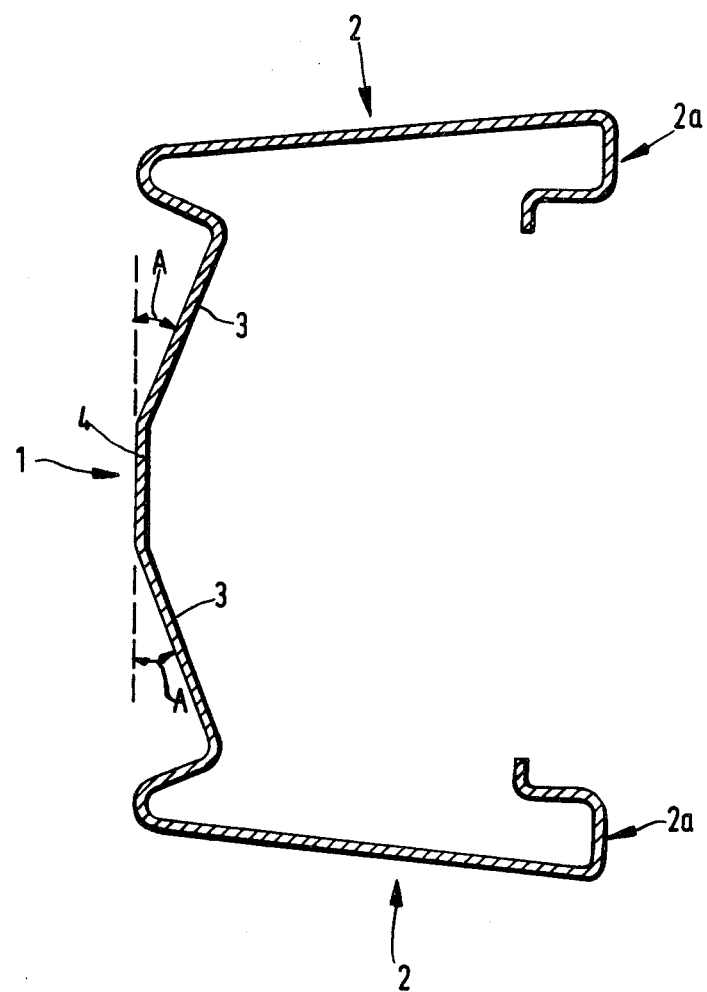

AUTOMOTIVE BUMPER

BACKGROUND OF THE INVENTION

The present invention relates to bumpers for motor vehicles and especially bumpers consisting of one single, shaped, element of thin sheet steel, having a substantially "C"-shaped cross-sectional profile which consists of a body and two wings.

By the term "thin sheet steel", in the following specification and claims, there is meant a sheet of steel preferably between 1 and 2 mm. thick.

The object of the present invention is to provide a bumper of the aforesaid type which will have a higher resistance to bending than known types.

SUMMARY OF THE INVENTION

According to the present invention, this object is achieved due to the fact that the body has at least one longitudinal rib.

According to a preferred embodiment the body has one single central longitudinal rib having a substantially "V"-shaped cross-section.

The bumper according to the invention is highly resistant to bending, and is at the same time simple and economical to manufacture.

In fact, shaping of the bumper can be effected by causing a band of thin sheet steel to pass through a roll forming machine.

BRIEF DESCRIPTION OF THE DRAWING

The invention will now be described with reference to the attached drawing, wherein the single FIGURE, by way of a non-restrictive example, shows, in cross-section, a bumper according to the invention.

DETAILED DESCRIPTION

The bumper illustrated consists of a section of thin sheet steel with a substantially "C"-shaped cross-section, made preferably by a shaping operation in a roll forming machine, with consequent work-hardening of the material.

This shaped section comprises a central body, shown in its entirety as 1, and two wings 2, the free edges 2a of which are turned back towards the inside.

The body 1 has at the center a longitudinal rib which gives the bumper a high resistance to bending.

This rib has a substantially "V"-shaped cross-section and consists of two inclined sides 3, connected centrally by a flat section 4, and converging towards the outside of the bumper.

The angle of inclination A of the sides 3 in relation to the flat section 4 should preferably be between 20° and 30°.

Upon the outer surface of the body of the bumper just described there may be applied a rubber shock absorber element. Moreover the bumper may have rounded terminal portions made in one piece, or else it can have added terminal elements of rubber.

According to a variant of the embodiment described, the body of the bumper may have a number of longitudinal ribs with a cross-sectional shape such as to give the cross-section of the body of the bumper a corrugated or a fretted shape.

Naturally the principle of the invention remaining the same, details of construction and forms of embodiment can be widely varied from what has been described and illustrated purely by way of non-restrictive example without nevertheless going beyond the scope of this invention.

What is claimed is:

1. An automotive vehicle bumper of the type having a single shaped element of thin sheet steel having in cross-section a substantially C-shaped profile comprising a web and two flanges, wherein the free edges of said flanges are turned toward the interior of the bumper profile and wherein the end portions of the web which join the flanges are abruptly turned inwardly toward the interior of the bumper extending a given distance therein and which are thereafter turned back toward the exterior of the bumper profile tapering toward and joining an intermediate flat central portion of the web residing in the plane defined by the ends of the web, and wherein the thickness of the sheet steel is on the order of 1 to 2 mm.

* * * * *